US006859798B1

(12) United States Patent
Bedell et al.

(10) Patent No.: US 6,859,798 B1
(45) Date of Patent: Feb. 22, 2005

(54) INTELLIGENCE SERVER SYSTEM

(75) Inventors: Jeffrey A. Bedell, Arlington, VA (US); Benjamin Z. Li, Great Falls, VA (US); Luis V. Orozco, Vienna, VA (US); Ramkumar Ramachandran, Reston, VA (US); Michael J. Saylor, Great Falls, VA (US); Stephen S. Trundle, Falls Church, VA (US)

(73) Assignee: MicroStrategy, Inc., McLean, VA (US)

( * ) Notice: Subject to any disclaimer, the term of this patent is extended or adjusted under 35 U.S.C. 154(b) by 691 days.

(21) Appl. No.: 09/884,472

(22) Filed: Jun. 20, 2001

(51) Int. Cl.[7] ............................................. G06F 15/18
(52) U.S. Cl. ...................................... 706/45; 707/10
(58) Field of Search ........................................... 706/45

(56) References Cited

U.S. PATENT DOCUMENTS

| | | | |
|---|---|---|---|
| 4,514,826 A | 4/1985 | Iwata | |
| 4,688,195 A | 8/1987 | Thompson | |
| 4,755,929 A | 7/1988 | Outous | |
| 4,829,423 A | 5/1989 | Tennant | |
| 4,876,643 A | 10/1989 | McNeil | |
| 5,197,005 A | 3/1993 | Shwartz | |
| 5,247,665 A | 9/1993 | Matsuda | |
| 5,276,870 A | 1/1994 | Shan | |
| 5,349,684 A | 9/1994 | Edem | |
| 5,418,943 A | 5/1995 | Borgida | |
| 5,421,008 A | 5/1995 | Banning | |
| 5,537,603 A | 7/1996 | Baum | |
| 5,555,403 A | 9/1996 | Cambot | |
| 5,584,024 A | 12/1996 | Shwartz | |
| 5,659,734 A | 8/1997 | Tsuruta | |
| 5,664,182 A | 9/1997 | Nirenberg | |
| 5,692,181 A | 11/1997 | Anand | |
| 5,864,856 A | 1/1999 | Young | |
| 5,914,878 A | 6/1999 | Yamamoto | |
| 5,970,493 A | 10/1999 | Shoup | |
| 6,006,251 A | 12/1999 | Yoyouchi | |
| 6,012,066 A | 1/2000 | Discount | |
| 6,073,134 A | 6/2000 | Shoup | |
| 6,078,924 A | 6/2000 | Ainsbury | |
| 6,108,657 A | 8/2000 | Shoup | |
| 6,154,766 A | * 11/2000 | Yost et al. | ................... 709/201 |
| 6,247,008 B1 | 6/2001 | Cambot | |
| 6,279,033 B1 | * 8/2001 | Selvarajan et al. | ......... 709/217 |
| 6,697,808 B1 | * 2/2004 | Hurwood et al. | ............. 707/10 |

OTHER PUBLICATIONS

Kurz, A. et al., Data warehousing within intranet: prototype of a web–based executive information system, IEEE Database and Expert Systems Applications, pp. 627–632.

(List continued on next page.)

*Primary Examiner*—Anthony Knight
*Assistant Examiner*—Michael B. Holmes
(74) *Attorney, Agent, or Firm*—Hunton & Williams LLP

(57) ABSTRACT

An intelligence server for a reporting system is disclosed. The reporting system may include a report initiation module, such as a user engine or calling application, for generating a request for a report. The intelligence server includes a server layer for receiving the generated request and for coordinating a flow of a processing of the received request; an application logic layer which includes business intelligence rules used for generating the report; and an analytical layer, in communication with the user engine and the server layer, for receiving the request to be processed from the server layer, transmitting the processed request to one or more data storage devices, and for extracting data from the data storage devices responsive to the transmitted request. The extracted data is then processed by the applications in the application logic layer to generate the report and the processing is independent of a user interface.

19 Claims, 3 Drawing Sheets

OTHER PUBLICATIONS

Robert C. Stern, Bruce M. Anderson and Craig W. Thompson, A Menu–Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20–24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp 151–158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu–Based Natural Language Interfaces To Databases, Proceedings of the Ninth International Conference on Very Large Data Bases, Florence, Italy, Oct. 31–Nov. 2, 1983, pp 43–55.

Craig W. Thompson, John Kolts, and Kenneth W. Ross, A Toolkit for Building "Menu–Based Natural Language" Interfaces, Texas Instruments Incorporated, P. O. Box 226015, MS 238, Dallas, Texas 75265, 1985.

Craig Warren Thompson, M.A., B.A., Using Menu–Based Natural Language Understanding to Avoid Problems Associated with Traditional Natural Language Interfaces to Databases, Dissertation Presented to the Faculty of the Graduate School of The University of Texas at Austin, May 1984.

MicroStrategy Introduces DSS Server 5.0, Dynamic Data Marts Enable Creation of Application Subsets, Reduce Warehouse Development Time, and Facilitate Integration with Third Party Tools.

MicroStratetgy Enhances DSS Server to Support E–Business Initiatives with Improved Performance, Reliability, and Scalability, 5.6 Release Increases Throughput, Streamlines Processing and Offers Support for Microsoft Cluster Server.

Microstrategy Announces Enhanced Versions of DSS Web and DSS Server, New 5.5 Versions offer Advanced Reporting Functionality on Top of the Industry's Most Powerful Analytical Engine for Enterprise–Wide DSS Solutions.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add–In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.
Administrator Guide MicroStratetgy Broadcast Server Version 6.5.

* cited by examiner

INTELLIGENCE SERVER SYSTEM

FIELD OF THE INVENTION

The invention relates to the field of data processing and analytics and, more particularly, to a scalable and customizable business intelligence platform.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating a user with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows a user to tap into an organization's vast store of operational data to track and respond to business trends that facilitate forecasting and planning efforts. A data mart may be considered to be a type of data warehouse that focuses on a particular business segment.

Decision support ("DSS"), business intelligence and reporting systems have been developed to efficiently retrieve selected information from data warehouses. One type of reporting system is known as an on-line analytical processing system ("OLAP"). In general, OLAP reporting systems analyze the data from a number of different perspectives and support complex analyses against large input data sets.

There are at least three different types of OLAP architectures: Relational On-Line Analytical Processing (ROLAP), Multidimensional On-Line Analytical Processing (MOLAP), and Hybrid Analytical Processing (HOLAP). ROLAP systems use a dynamic server connected to a relational database system. MOLAP systems utilize a proprietary multidimensional database (MDDB) to provide OLAP analyses. The main premise of this architecture is that data must be stored multidimensionally to be viewed multidimensionally. HOLAP systems are a hybrid of the other two.

ROLAP is a three-tier, client/server architecture comprising a presentation tier, an application logic tier, and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database (e.g., the data warehouse).

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into standard query language (SQL) execution plans. The SQL is submitted to the relational database for processing, the relational query results are cross-tabulated, and a multidimensional result set is returned to the end user. ROLAP is a fully dynamic architecture capable of utilizing pre-calculated results when they are available, or dynamically generating results from atomic information when necessary.

The ROLAP architecture directly accesses data from data warehouses and, therefore, supports optimization techniques to meet batch window requirements and to provide fast response times. These optimization techniques typically include application level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB system through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times. Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The hybrid OLAP (HOLAP) solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from a source relational database management system (RDBMS) and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server-side and a module is typically provided at a client-side to enable users to input queries and report requests to the OLAP engine. In some systems, such queries and report requests are directed to a single designated server upon which the OLAP engine resides. Thus, if this single designated server fails, all previously input queries and report requests are typically lost and each user typically has to input new queries and report requests to another single designated server upon which another OLAP engine resides. This can obviously be time consuming and costly.

In other systems, such queries and report requests may be directed to one of sever al servers, each of which contains an OLAP engine. Typically, a user is assigned to one of these servers based upon a simple sequential scheme (e.g., a round-robin scheme). However, as with the single designated server described above, if any one of these several servers fails, all previously input queries and report requests are typically lost and each user typically has to input new queries and report requests to another one of several servers. Even if none of these several servers fails, there still may be loading problems associated with the servers. That is, some queries and report requests may be significantly more intensive and time consuming than others, and these more intensive and time consuming queries and report requests may be assigned to the same server. Thus, some servers may be overloaded, while other servers may be underloaded. This can obviously be very inefficient.

Another drawback of existing reporting systems is that they tend to be designed for one specific operating system or platform and one specific client interface. Many reporting systems are also based upon proprietary formats. For example, an existing reporting system may be designed for the Microsoft Windows operating system environment and cannot be used for web-based reporting applications and vice versa. Today, however, where many organizations are large enterprises of different businesses and include many different types of computers, databases and reporting requirements, reporting systems based on closed, proprietary standards lack the flexibility needed for such robust business environments.

Another drawback of existing systems is that many are designed for use with only a single type of database format. However, there are many commonly-used database formats such as Microsoft Access, SQL, DB2 and many others. A flexible platform based on open standards is needed to support analytical and reporting applications across multiple types of database formats.

These and other drawbacks exist with respect to current reporting systems.

BRIEF SUMMARY OF THE INVENTION

It is therefore an object of the present invention to provide a reporting system having a component based architecture wherein such components are invoked on an as-needed basis in order to avoid overloading servers.

It is an additional object of the invention to provide a reporting system which serves business intelligence and reporting applications from any operating system environment.

It is a further object of the invention to provide a reporting system that facilitates interaction with all standard database formats.

Additional objects and advantages of the invention will be set forth in part in the description which follows, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, this invention, in one aspect, includes a reporting system comprising a a report initiating module that generates a request for a report (e.g., a user engine, calling application or other report request system, including systems connected over various networks to the intelligence server); one or more data storage devices for holding the data used for generating the report; an intelligence server, in communication with the user engine, for receiving the generated request from the user engine, and for routing the request for processing, the intelligence server including an object server for controlling and managing all application objects independent of an interface or a user; an administrative facility for managing activity of the intelligence server; a query engine for mediating the generated request received from the user engine to format and process the request, submitting the request against the data stored in the one or more data storage devices, extracting the data from the data storage devices and returning one or more result sets from the submitted request; and an analytical engine for receiving the result sets, performing further processing of the result sets by running a plurality of statistical analyses of the data included in the result sets to generate a report for presentation to a user.

In another aspect, the invention includes a method for generating a report comprising the steps of receiving a request for a report from a user; transmitting the received request to a query engine; identifying one or more data storage devices to receive the request; transmitting the request to the identified one or more data storage devices; extracting data from the one or more data storage devices responsive to the transmitted request to form one or more result sets; transmitting the one or more result sets to an analytical engine; and generating a report from the one or more result sets.

In yet another aspect, the invention includes an intelligence server for a reporting system, wherein the reporting system includes a report initiating module that generates a request for a report, the intelligence server comprising a server layer for receiving the generated request and for coordinating a flow and a processing order of the received request in accordance with a predetermined prioritization scheme; an application logic layer including a plurality of business intelligence rules used for generating the report; an interface layer between the server layer and the application logic layer; an analytical layer, in communication with the user engine and the server layer, for receiving the request to be processed from the server layer, transmitting the processed request to one or more data storage devices, and for extracting data from the one or more data storage devices responsive to the transmitted request; and an interface layer between the server layer and the analytical layer; wherein the extracted data is processed by the application logic layer to generate the report and the processing is independent of a user interface.

The accompanying drawings, which are incorporated in and constitute a part of this specification, illustrate the embodiments of the invention and, together with the description, serve to explain the principles of the invention.

DETAILED DESCRIPTION OF THE INVENTION

Figure 1:
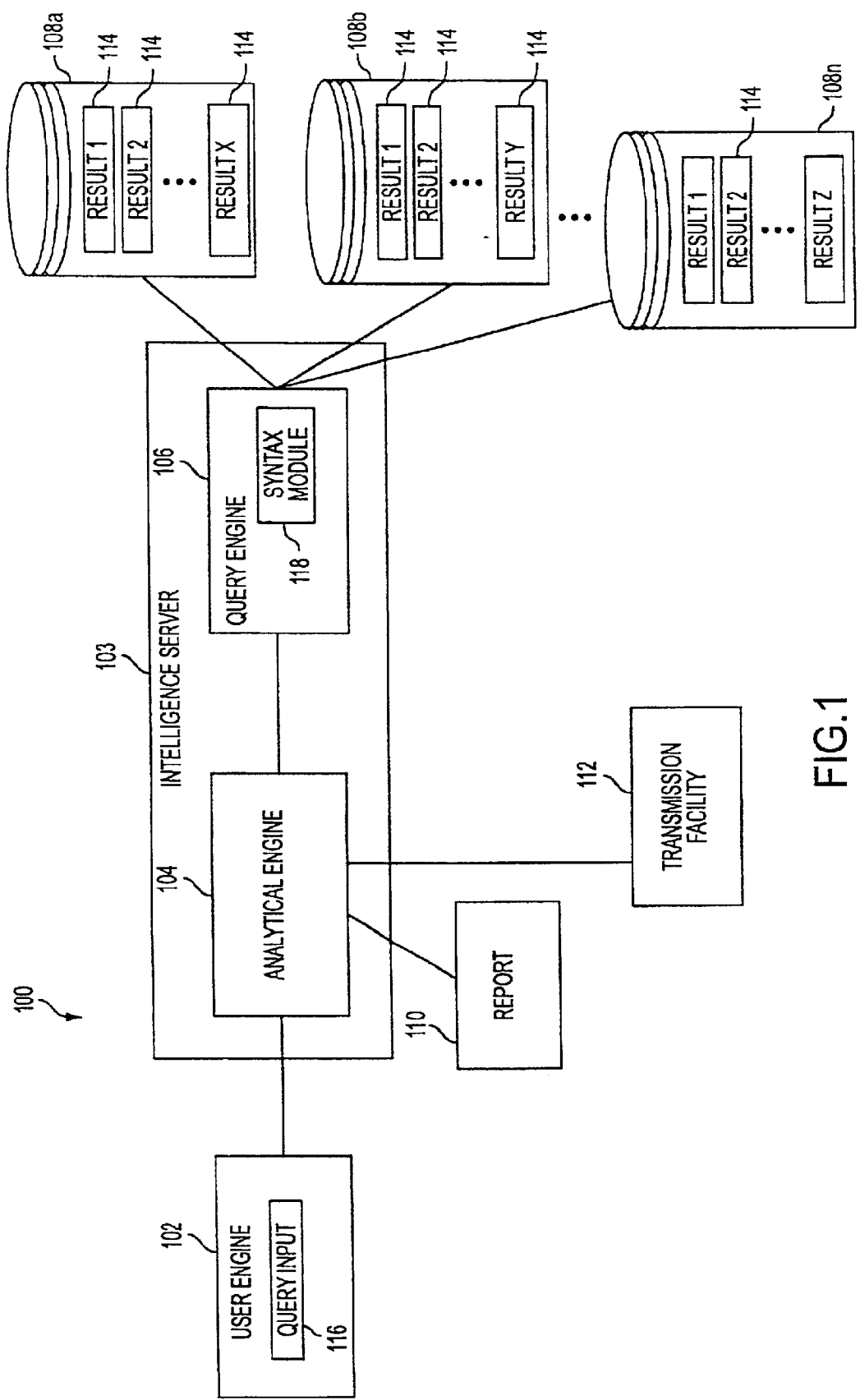
FIG. 1 is a block diagram illustrating an architecture for a reporting system according to an embodiment of the invention.

Reference will now be made in detail to the present preferred embodiments of the invention, examples of which are illustrated in the accompanying drawings in which like reference characters refer to corresponding elements.

FIG. 1 is a block diagram illustrating a reporting system 100 by which a variety of data resources may be accessed for business analytic, report generation and other intelligence purposes according to an embodiment of the invention. According to a preferred embodiment, the reporting system 100 may comprise a business intelligence, Online Analytical Processing (OLAP) decision support system (DSS) or other reporting system. In particular, FIG. 1 may comprise a portion of the MicroStrategy 7 or 7.1 platform which provides a preferred system in which the present invention may be implemented.

In general, through using the reporting system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, the reporting system 100 may enable the creation of reports or the provision of services that are processed according to a predetermined schedule. The user may then subscribe to the services, provide personalization criteria and have the reports automatically delivered to the user, as described in U.S. Pat. No. 6,154,766 to Yost et al. (the "'766 patent"), which is commonly assigned and hereby incorporated by reference.

As illustrated in FIG. 1, a business, a government or another user may access the resources of the reporting system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the reporting system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the reporting system 100 may include or interface to or be supported by computing resources, such as one or more associated servers. When a server is employed for support, the server may include, for instance, a workstation running a Microsoft Windows™ NT™ operating system a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, the analytical engine 104 and the query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b. . . 108n for processing.

If the transmitted query cannot be processed in its original format, the query engine 106 may perform a translation of the query from an original syntax to a syntax compatible with one or more of the data storage devices 10a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the reporting system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the reporting system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the reporting system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users of the service may then receive access to reports through various types of data delivery devices including telephones, pagers, computers, PDAs, WAP protocol devices, email, facsimile, and many others. In addition, a subscriber/user may specify trigger conditions so that the subscriber/user receives a report only when a trigger condition has been satisfied, as described in detail in the '766 patent. The reporting system 100 of FIG. 1 may have many other uses, as described in detail with respect to the MicroStrategy 7 and 7.1 platforms, the details of which will be appreciated by one of ordinary skill in the reporting and decision support system art.

Figure 2:
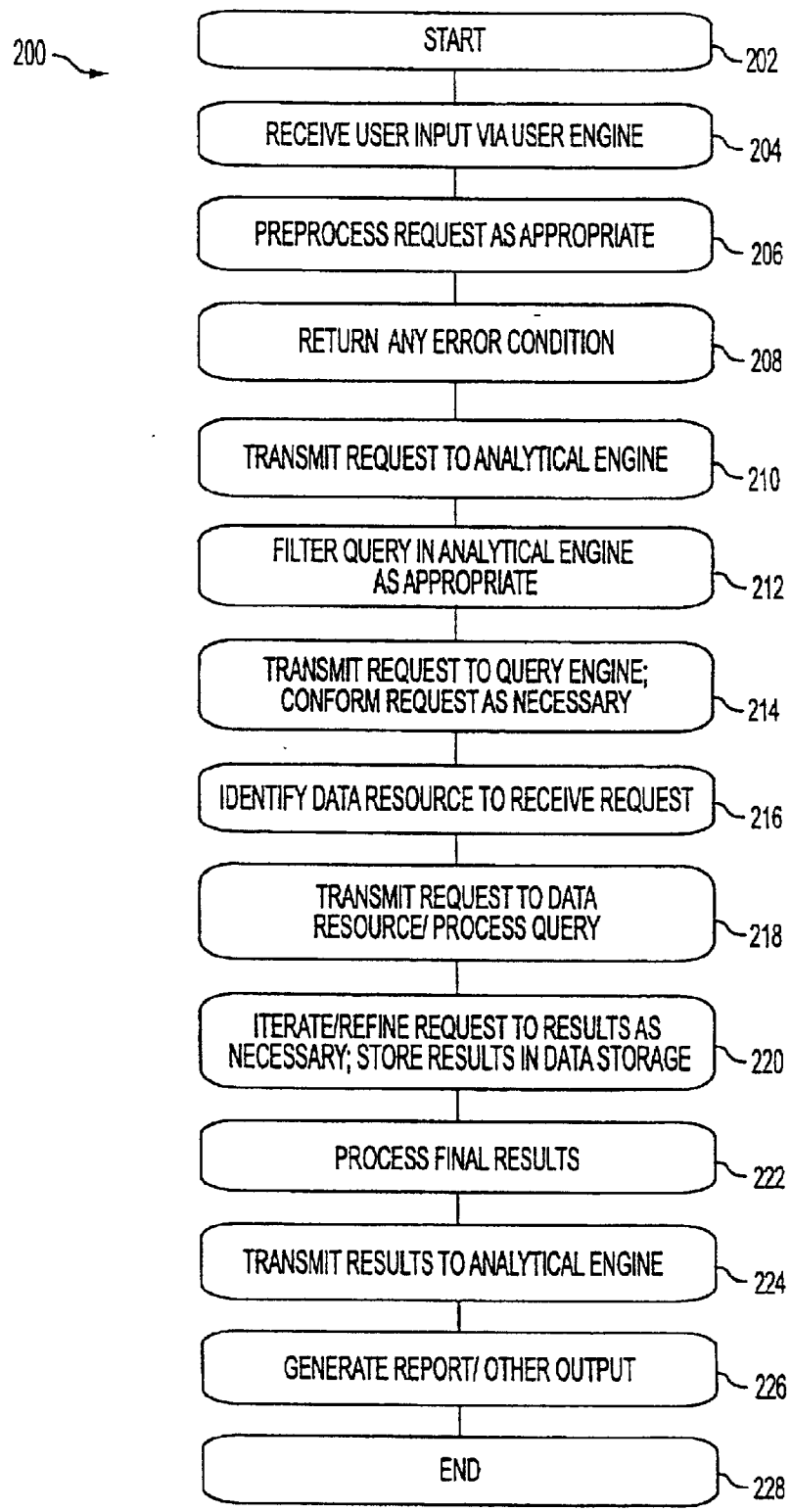
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may resolve the query request directly or determine that the query requires further processing by the query engine 106. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b. . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
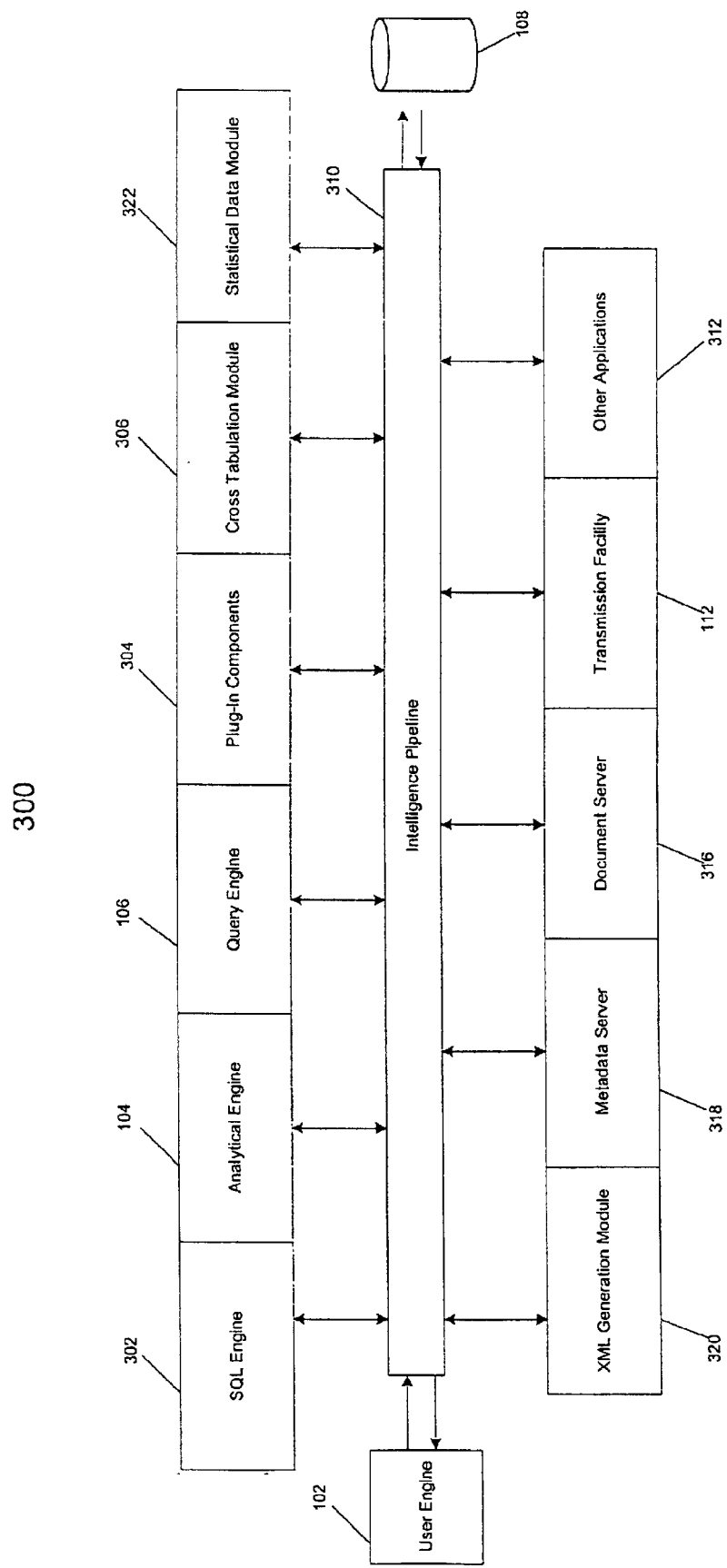
FIG. 3 illustrates a block diagram of an intelligent server according to an embodiment of the invention.

In a particular embodiment of the invention illustrated in FIG. 3, some or all of the functions of the reporting system 100 can be centralized and included as components of an intelligence server 300 (or the intelligence server 103 of FIG. 1). The intelligence server 300 hosts the components required for analytical execution of requests, report execution, element browsing and DSS application logic and object operations. The intelligence server 300 may also include additional plug-in components 120 which can further extend the functional capabilities of the intelligence server 300. For example, the intelligence server 300 may include a cross tabulation module 306, an XML generation module 320, a metadata server 318, a document server 316, the transmission facility 112 and a plurality of other applications 312 as needed to realize a robust reporting system 100 capable of responding to the needs of a vast array of users across the entire enterprise of an organization independent of the type of user interface employed. The various functional modules may communicate, interact with and interface to one another through an intelligence pipeline 310.

The intelligence server 300 has a component-based architecture referred to as "intelligent portal architecture" wherein the functions of the reporting system 100 are all component-level services which can be invoked on an as-needed basis based upon usage requirements to ensure efficient operation of the reporting system 100. The processing logic of the intelligence server 300 provides for the handling of requests by queueing and prioritization and is driven by a logistic module that directs workflow to proper processing components as invoked. For example, the intelligence server 300 may use a dependency map that defines an input and an output of each processing step to generate a road map for each request. Based on the generated roadmap, the intelligence server 300 routes the request to a specific component or components in a proper order until the request is processed. Requests that are received by the intelligence server 300 are handled by a dispatcher component within the intelligence pipeline 310. The dispatcher component forwards each request to a server appropriate to the request. The intelligence server 300 may also include a component to enforce system security (not shown).

Additionally, because of the plug-in nature of the components, the intelligence server 300 can be customized to suit a particular business enterprise's needs. For example, for computationally intensive applications, the intelligence server 300 may increase the resources dedicated to the analytical engine 104. Or, alternatively, the intelligence server 300 can include multiple analytical engines 104 having discrete resources allocated to each analytical engine 104. In this manner, a scalable business intelligence and reporting system 100 can be achieved thereby realizing the ability to respond to requests of many diverse users across an organization's enterprise or in different organizations.

The intelligence server 300 also acts to coordinate and synchronize the flow of requests within the various components resident in the intelligence server 300 by use of queueing, prioritization and governing mechanisms. The dispatcher component looks for an underutilized server that can efficiently process the request. When load on the intelligence server 300 exceeds a predetermined threshold load, more intelligence servers 300 can be added to the reporting system 100. If a server experiences a failure, a request can be re-routed to another server. Thus, loads are balanced across components preventing the reporting system 100 from becoming overloaded and failing.

Intelligent portal architecture also differs from traditional client-server architecture because it is based upon open web-based standards such as Java, HTML and XML rather than proprietary formats. Thus, processing of requests by the intelligence server 300 can be conducted independent of the type of user interface employed at a user engine 102. Open web-based standards also help to provide a secure, high performance, low cost reporting system 100 capable of rapid deployment of quality business reports which may be easily distributed to users, such as via a web site or via email and also enable reports to be more easily customized to a user's needs.

The intelligence server 300 also provides centralized database access and management for its components. To boost performance, the intelligence server 300 may further utilize database connection pooling, monitoring and governing to control the overall processing load to each server and better utilize database servers.

The intelligence server 300 is designed to communicate with users of all types, with user interfaces of all types, with Web servers, and with other application servers (such as SAP, People Soft and others) to take/send user requests and to exchange data in a variety of formats. For example, with the emergence of XML, the intelligence server 300 may provide a more open communication protocol by talking in this new open standard language, i.e., a user can send a request to the intelligence server 300 in an XML string, and the intelligence server 300 will send back its result in XML as well.

As shown in FIG. 3, the intelligence server 300 can be thought of as consisting of four functional layers. The four layers of the intelligence server 300 include (at the highest level) a server layer which, as described above, functions to handle requests from multiple interface agents including user interfaces (UIs) and application programming interfaces (APIs). The server layer also functions to coordinate the handling and flow of requests within the various components resident in the intelligence server 300 including queueing, prioritization, and governing mechanisms.

An analytical layer comprising the analytical engine 104 and the query engine 106, for example, provides all services for decision support. As described above, the analytical engine 104 processes result sets 114 to generate a quantitative report 110 which may be presented to a user at the user engine 102 or transmitted to the transmission facility 112 for transmission to users. The query engine 106 communicates with one or more data storage devices 108 so as to obtain requested data, as also described above.

The intelligence server 300 further includes an application logic layer which includes all of the objects necessary for supporting a business intelligence application including, for example, reports and projects. In other words, all of the application logic and business intelligence rules needed for the reporting system 100 reside in a single centralized location, i.e., in the intelligence server 300. Additionally, a set of application programming interfaces (APIs) serves as an interface between the server layer and the application logic layer to coordinate user requests, administrative requests, design requests and application requests.

The intelligence server 300 may further include a statistical data module 322 that monitors and captures data relating to the usage patterns of the intelligence server 300 in a relational database in order to detect loads and balance loads among the various components or make other adjustments as necessary to ensure efficient operation of the reporting system 100. Additionally, the intelligence server 300 may include an administrative module (not shown) that fulfills administrative requests for information about current usage activity on the intelligence server 300 and executes administrative commands to change operating settings and governors. A command manager tool (not shown) may also be utilized to facilitate the performance of certain administrator tasks. These command manager capabilities allow additions, deletions, or updates to enterprise-level data associated with large numbers of users and user groups. The command manager tool may include a command manager graphical user interface (GUI), a command manager executor (a tools asynchronous processing function set), and capabilities available through a command line. The command line may be a console whereby a user may input text commands directly to a server. Such text commands provide the ability to perform various administrative tasks easily and effectively. For example, administrative tasks that are repetitive, such as creating a user on the reporting system 100, or, alternatively, tasks that are performed in bulk may be performed more easily through utilization of the command line than through utilization of conventional techniques. In order to utilize this feature, a text script may be created and stored in a text file. The text file may be changed utilizing copying and pasting techniques within that text file, for example. This text file may then be saved and utilized in bulk operations. Thereafter, the entire text file may be submitted to a command line processor all at once. As a result, certain tasks may be easily performed in bulk. It should be appreciated that a typical user of the reporting system 100 will commonly interface with the reporting system 100 in a manner which is very interactive. In contrast, an administrative user who is supporting the reporting system 100 often desires to conduct tasks in bulk and as quickly as possible. Thus, an administrative user may create a substantial number of users, change a substantial number of users' passwords, or adjust a wide variety of administrative settings by utilizing this tool, for example.

This intelligent portal architecture minimizes the client/server communication by keeping an object server, report server, and administrative server at the client (user) side to cache all prior user-requested objects. In this architecture, most calls to a cached object will be handled within the user engine 102 to achieve the best performance. For example, during the editing of an object, e.g., a filter, all operation on the filter is handled on the client (user engine 102) side. When the editing is completed, the entire definition of the filter will be transported to the intelligence server side 300 of the reporting system 100.

Another advantage of the plug-in component nature of the intelligence server 300 is that any part of the server functions may be moved outside the intelligence server 300 into a secondary server. For example, if running a report requires too much of the reporting system 100 resources, the SQL engine 302, the query engine 106, and/or the analytical engine 104 may be moved outside of the intelligence server 300 into a secondary server which has a main responsibility to run a report. The architecture may also be configured to have one main intelligence server 300 and multiple secondary servers. As another alternative, the reporting system 100 may also be configured so that there are a plurality of user engines 102, a plurality of intelligence servers 300 and a plurality of data storage devices 108. In such a system, each of the plurality of intelligence servers 300 may include an analytical engine 104 and a query engine 106, in addition to the other component modules.

In addition to the various components of the intelligence server 300 illustrated in FIG. 3, components may be provided in the application logic layer for one or more of object browsing, report viewing, server monitoring, and object construction and administration. Each of these components also will interact with associated APIs.

It should be noted that the functions associated with the intelligence server system may be implemented in hardware or software. For example, specific electronic components may be employed in a user engine 102 and an intelligence server 300 for implementing the functions associated with the intelligence server system. Alternatively, one or more processors operating in accordance with stored instructions may implement the functions associated with the intelligence server system 300. If such is the case, it is within the scope of the present invention that such instructions may be transmitted to the user engine 102 and the intelligence server 300 via one or more signals.

The intelligent portal architecture of the intelligence server 300, utilizing plug-in components which may be invoked on an as-needed basis enable the implementation of a robust reporting system 100 which may be easily integrated into web-based user applications and facilitates customization of reports. Moreover, the resulting system 100 is scalable to millions of potential users and terabytes of data.

It will be apparent to those skilled in the art that various modifications and variations can be made in the apparatuses and methods of the present invention without departing from the scope or spirit of the invention. Thus, it is intended that the present invention cover the modifications and variations of this invention provided they come within the scope of the appended claims and their equivalents.

What is claimed is:

1. A reporting system comprising:
   a report initiating means for generating a request for a report;
   one or more data storage devices for holding the data used for generating the report;
   an intelligence server, in communication with the report initiating means, for receiving the generated request from the report initiating means, and for routing the request for processing, the intelligence server including
   an object server for controlling and managing all application objects independent of an interface or a user;
   a query engine for mediating the generated request received from the report initiating means to format and process the request, submitting the request against the data stored in the one or more data storage devices, extracting the data from the data storage devices and returning one or more result sets from the submitted request; and
   an analytical engine for receiving the result sets, performing further processing of the result sets by running a plurality of statistical analyses of the data included in the result sets to generate a report for presentation to a user.

2. The reporting system as claimed in claim 1 further comprising a transmission facility for transmission of a generated report via a communication channel to the user.

3. The reporting system as claimed in claim 2 wherein the transmission facility may transmit the generated report to the user using one or more of an email communication channel, a text-to-message communication channel, a video communication channel, a web site communication channel, a telephone communication channel, a facsimile communication channel, a pager communication channel, a PDA communication channel, and a WAP protocol device communication channel.

4. The reporting system as claimed in claim 1 wherein there are a plurality of report initiating means, a plurality of analytical engines and a plurality of query engines.

5. A method for generating a report comprising the steps of:
   receiving a request for a report from a user;
   transmitting the received request to a query engine;
   identifying one or more data storage devices to receive the request;
   transmitting the request to the identified one or more data storage devices;
   extracting data from the one or more data storage devices responsive to the transmitted request to form one or more result sets;
   transmitting the one or more result sets to an analytical engine; and
   generating a report from the result sets.

6. The method as claimed in claim 5 further comprising the step of pre-processing the received request prior to the transmitting the received request step and the step of filtering the transmitted request after the step of transmitting the received request if the received request cannot be transmitted to the data storage devices in its original format.

7. An intelligence server for a reporting system, wherein the reporting system includes a report initiating means for generating a request for a report, the intelligence server comprising:

a server layer for receiving the generated request and for coordinating a flow of processing of the received request in accordance with a predetermined prioritization scheme;

an application logic layer including a plurality of business intelligence rules used for generating the report;

an analytical layer, in communication with the report initiation means and the server layer, for receiving the request to be processed from the server layer, transmitting the processed request to one or more data storage devices, and for extracting data from the one or more data storage devices responsive to the transmitted request; and wherein the extracted data is processed by the application logic layer to generate the report and the processing is independent of a user interface.

8. The intelligence server as claimed in claim 7 wherein the analytical layer includes:

an analytical engine for receiving the generated request from the report initiation means and for running a plurality of statistical analyses of data according to the generated request; and a query engine, in communication with the analytical engine, for mediating the generated request received from the report initiation means, formatting and processing the request, submitting the formatted request to the data storage devices, extracting the data from the data storage devices and returning one or more result sets from the submitted requests.

9. The intelligence server as claimed in 7 further comprising a statistical data module for monitoring and capturing data relating to a plurality of usage patterns of the intelligence server.

10. The intelligence server as claimed in claim 7 further comprising a transmission facility for transmission of a generated report via a communication channel to a user.

11. The intelligence server as claimed in claim 10 wherein the transmission facility may transmit the generated report to the user using one or more of an email communication channel, a text-to-message communication channel, a video communication channel, a web site communication channel, a telephone communication channel, a facsimile communication channel, a pager communication channel, a PDA communication channel; and a WAP protocol device communication channel.

12. The intelligence server as claimed in claim 7 wherein the analytical layer includes:

a plurality of analytical engines for receiving the generated request from the report initiation means and for running a plurality of statistical analyses of data according to the generated request; and a query engine, in communication with the analytical engine, for mediating the generated request received from the report initiation means, formatting and processing the request, submitting the formatted request to the data storage devices, extracting the data from the data storage devices and returning one or more result sets from the submitted request.

13. The intelligence server as claimed in claim 7 wherein the application logic layer includes an XML generation module for converting a received request to an XML format and for converting a result set to the XML format.

14. The intelligence server as claimed in claim 7 wherein the application logic layer includes one or more components for report viewing, one or more components for server monitoring, one or more components for object construction and one or more components for administration of the reporting system.

15. The intelligence server as claimed in claim 7 wherein a plurality of report initiation meanss generate a plurality of requests for reports and wherein the server layer includes a number of servers as needed to respond to the plurality of requests for reports without failure.

16. The intelligence server as claimed in claim 7 wherein a plurality of intelligence servers are provided for the reporting system.

17. The intelligence server as claimed in claim 7 wherein the analytical layer includes:

a plurality of analytical engines for receiving the generated request from the report initiation means and for running a plurality of statistical analyses of data according to the generated request; and a plurality of query engines, each in communication with the plurality of analytical engines, for mediating the generated request received from the report initiation means, formatting and processing the request, submitting the formatted request to the data storage devices, extracting the data from the data storage devices and returning one or more result sets from the submitted request.

18. The intelligence server as claimed in claim 7 further comprising an administrative console and an application programming interface to monitor and manage all activity on the intelligence server.

19. The intelligence server as claimed in claim 7 further comprising a command line interface capable of receiving a script based command to be translated into a user request or an administrative request.

* * * * *